United States Patent
Watanabe et al.

(10) Patent No.: US 7,513,158 B2
(45) Date of Patent: Apr. 7, 2009

(54) ULTRASONIC SENSOR FOR USE IN AUTOMOTIVE VEHICLE

(75) Inventors: Kazuaki Watanabe, Nagoya (JP); Makiko Sugiura, Hekinan (JP); Yasuyuki Okuda, Aichi-gun (JP)

(73) Assignee: Denso Corporation, Kariya (JP)

( * ) Notice: Subject to any disclaimer, the term of this patent is extended or adjusted under 35 U.S.C. 154(b) by 14 days.

(21) Appl. No.: 11/902,382

(22) Filed: Sep. 21, 2007

(65) Prior Publication Data

US 2008/0087090 A1 Apr. 17, 2008

(30) Foreign Application Priority Data

Oct. 13, 2006 (JP) ............... 2006-280021

(51) Int. Cl.
*G01N 29/00* (2006.01)

(52) U.S. Cl. ............... 73/584; 73/627; 73/629; 73/632

(58) Field of Classification Search ............... 73/584, 73/629, 632, 644, 861.18, 861.25, 861.26, 73/861.27, 862, 337
See application file for complete search history.

(56) References Cited

U.S. PATENT DOCUMENTS

| | | | | |
|---|---|---|---|---|
| 5,275,060 A | * | 1/1994 | Lynnworth | 73/861.18 |
| 5,709,432 A | * | 1/1998 | Gryp | 297/411.32 |
| 6,672,166 B2 | * | 1/2004 | Pfeifer | 73/632 |
| 7,398,687 B2 | * | 7/2008 | Nakajima et al. | 73/661 |
| 2006/0196272 A1 | | 9/2006 | Sugiura et al. | |
| 2007/0115102 A1 | * | 5/2007 | Nakano et al. | 340/435 |
| 2007/0115758 A1 | * | 5/2007 | Kojima et al. | 367/197 |

FOREIGN PATENT DOCUMENTS

| | | |
|---|---|---|
| JP | A-60-113600 | 6/1985 |
| JP | A-05-347797 | 12/1993 |
| JP | A-2006-122188 | 5/2006 |

* cited by examiner

*Primary Examiner*—Hezron Williams
*Assistant Examiner*—J M Saint Surin
(74) *Attorney, Agent, or Firm*—Posz Law Group, PLC

(57) ABSTRACT

An ultrasonic sensor for detecting a position and/or a shape of an object located around an automotive vehicle is mounted on a structure of the vehicle such as a bumper. The ultrasonic sensor includes a receiving member for receiving ultrasonic waves reflected on the object to be detected and receiving element having plural vibrating portions. The receiving member is sectioned by intercepting slits into plural receiving regions each corresponding to each vibrating portion. The intercepting slit eliminates or suppresses crosstalk between neighboring receiving regions, and thereby reducing detection noises due to the crosstalk and improving detection sensitivity of the ultrasonic sensor. The shape of the intercepting slit is made to satisfy the formula: $0.35 \leq L/T \leq 0.60$, where L is a depth of the slit and T is a thickness of the receiving member. In this manner, the crosstalk resulting in detection noises is sufficiently suppressed.

12 Claims, 6 Drawing Sheets

ULTRASONIC SENSOR FOR USE IN AUTOMOTIVE VEHICLE

CROSS-REFERENCE TO RELATED APPLICATION

This application is based upon and claims benefit of priority of Japanese Patent Application No. 2006-280021 filed on Oct. 13, 2006, the content of which is incorporated herein by reference.

BACKGROUND OF THE INVENTION

1. Field of the Invention

The present invention relates to an ultrasonic sensor for use in an automotive vehicle, the ultrasonic sensor receiving ultrasonic waves reflected on an object to be detected.

2. Description of Related Art

Recently, an ultrasonic sensor has been mounted on an automotive vehicle to detect an obstacle located around the vehicle. Ultrasonic waves are transmitted from the vehicle, and the ultrasonic waves reflected on the obstacle are received by the ultrasonic sensor mounted on the vehicle. A distance of the obstacle from the vehicle and/or its two-dimensional or three-dimensional shape are detected based on the transmitted and received ultrasonic waves.

In this type of sensor, the position of the obstacle may be detected based on a time difference among plural sensors in receiving the reflected waves. The plural sensors are mounted on a receiving member that delivers the received ultrasonic waves to individual sensor elements. In this structure, however, there is a problem that a crosstalk of the ultrasonic waves occurs in the receiving member. That is, the received ultrasonic waves are not sufficiently separated to individual sensor elements, and accordingly, detection sensitivity of the ultrasonic sensor is lowered. To cope with this problem, JP-A-5-347797 proposes to fill a space between individual vibrating plates with an intercepting material for preventing transfer of the ultrasonic waves. In this manner, it intends to reduce an amount of crosstalk between neighboring vibrating plates.

However, the proposed structure of the ultrasonic sensor involves such a problem that a space for filling the intercepting material is required between neighboring vibrating plates. This makes the ultrasonic sensor large in size and adversely affects an ornamental design of the ultrasonic sensor that is mounted on a bumper of a vehicle.

SUMMARY OF THE INVENTION

The present invention has been made in view of the above-mentioned problem, and an object of the present invention is to provide an improved ultrasonic sensor to be mounted on an automotive vehicle, wherein crosstalk between neighboring receiving regions in a receiving member is suppressed while keeping the size of the ultrasonic sensor small.

The ultrasonic sensor is mainly composed of a receiving member, a receiving element mounted on the receiving member, and a casing covering the receiving element. The receiving member is made of a material such as polycarbonate resin, and has a first surface for receiving ultrasonic waves reflected on an object such as an obstacle located around an automotive vehicle and a second surface on which the receiving element is mounted. The receiving element made of a semiconductor material includes plural vibrating portions and supporting portions for supporting the vibrating portions. The receiving member is sectioned into plural receiving regions each corresponding to each vibrating portion of the receiving element.

Neighboring receiving regions are separated by a intercepting slit for suppressing crosstalk between the neighboring receiving regions. The intercepting slit extends in a direction substantially perpendicular to the second surface of the receiving member and has an opening open to the second surface and a closed end in the receiving member. The slit is made to satisfy a formula: $0.35 \leq L/T \leq 0.6$, where L is a depth of the intercepting slit and T is a thickness of the receiving member. By making the intercepting slit in this shape, the crosstalk between neighboring regions, which results in detection noises, is effectively suppressed or eliminated.

The ultrasonic sensor is mounted on a structure of an automotive vehicle such as a bumper. In case where the ultrasonic sensor is mounted on the bumper, its first surface exposes to an outside of the bumper and its second surface is positioned inside of the bumper. Ultrasonic waves transmitted from a transmitting element mounted on the vehicle are reflected on an object to be detected. The reflected waves are received by the first surface of the receiving member and propagated to vibrating portions through respective receiving regions and supporting portions. Vibrations of the vibrating portions are converted into electrical signals by a vibration detector such as a piezoelectric detector. A distance to the object from the vehicle and/or a shape of the object is detected based on the signals outputted through the plural vibrating portions.

By forming the intercepting slit to satisfy a relation $L/T=0.45$, the crosstalk between neighboring receiving regions is completely intercepted, and thereby the ultrasonic waves received by a receiving region corresponding to a vibrating portion are exclusively propagated to that vibrating portion, completely eliminating noises due to the crosstalk. The detection sensitivity of the ultrasonic sensor is maximized by making the intercepting slit to satisfy the relation $L/T=0.45$.

When the depth L of the intercepting slit is made smaller than 0.45T and larger than 0.35T, the crosstalk is sufficiently suppressed while maintaining a mechanical strength of the receiving member. When the depth L of the intercepting slit is made larger than 0.45T and smaller than 0.6T, the crosstalk is sufficiently suppressed and the noises due to the crosstalk are easily processed because the noises are in inverse phase relative to the main signals.

According to the present invention, detection noises due to the crosstalk are eliminated or sufficiently suppressed while keeping the size of the ultrasonic sensor compact. Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to accompanying drawings. The embodiment shown herein is an ultrasonic sensor to be mounted on an automotive vehicle for detecting an obstacle or obstacles located around the vehicle.

Figure 1A:
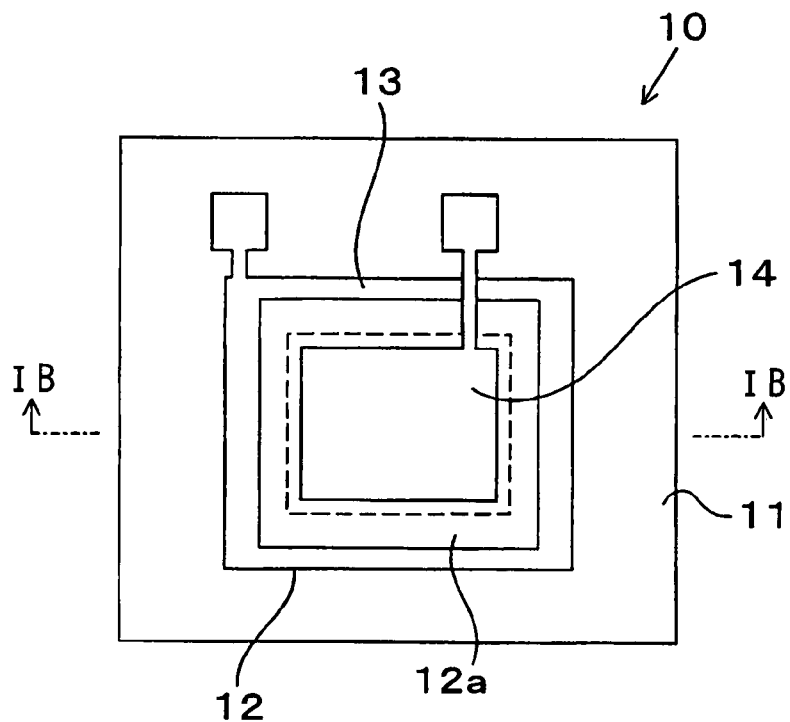
FIG. 1A is a plan view showing an individual receiving element of an ultrasonic sensor according to the present invention.

First, a receiving element 10 that includes plural individual receiving elements will be described. In this particular embodiment, four individual receiving elements 10a-10d are formed on the receiving element 10, as shown in FIG. 2. FIG. 1A shows an individual receiving element (the individual receiving elements 10a-10d are all the same, and each of them is generally referred to as a receiving element 10), and FIG. 1B shows a cross-sectional view of the receiving element 10.

Figure 1B:
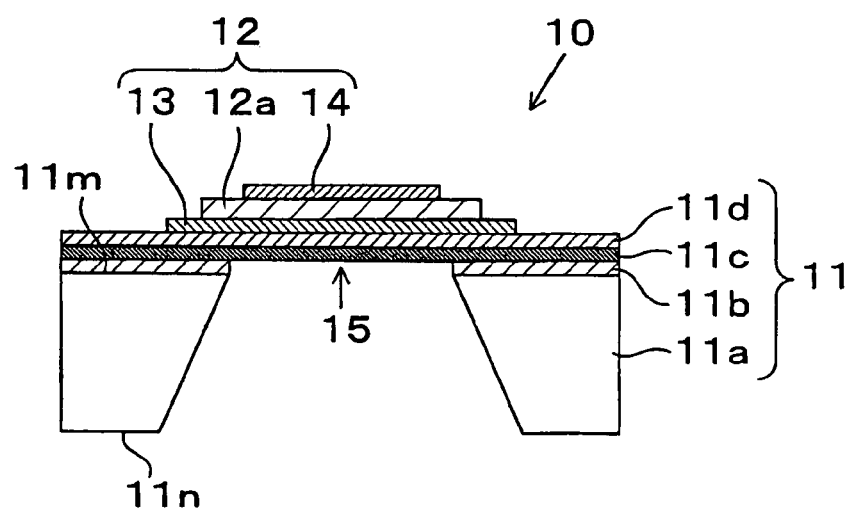
FIG. 1B is a cross-sectional view showing the receiving element, taken along line IB-IB shown in FIG. 1.
Figure 2:
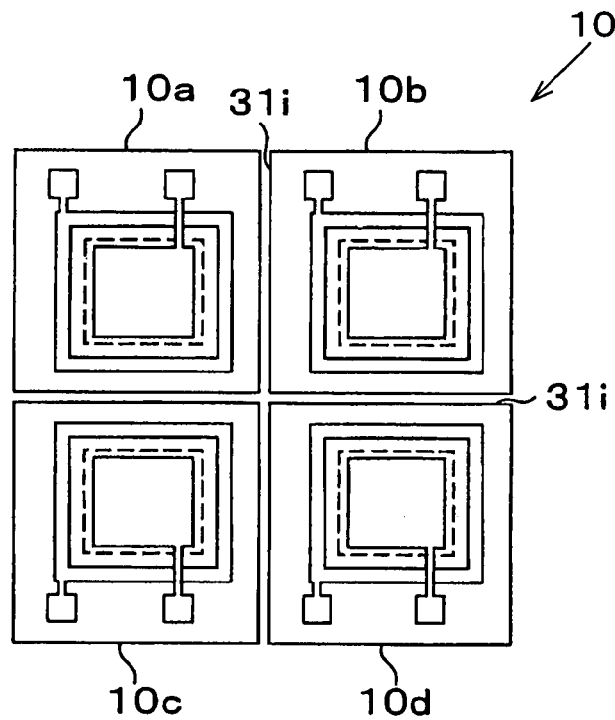
FIG. 2 is a plan view showing an entire receiving element including four individual receiving elements.

As shown in FIG. 1B, the receiving element 10 is formed on a semiconductor substrate 11 such as a silicon-on-insulator (SOI) substrate. On the upper surface 11m of the semiconductor substrate, a first insulation film 11b, a silicon active layer 11c and a second insulation layer 11d are formed in this order in a laminated manner. A center portion of the substrate 11 are removed by a MEMS process to expose the silicon active layer 11c downward thereby to form a vibrating portion 15. The vibrating portion 15 has a square plane.

On the second insulation film 11d, a vibration detector 12 is formed. The vibration detector 12 is composed of a lower electrode 13, a piezoelectric film 12a and an upper electrode 14. The piezoelectric film 12a made of lead zirconate titanate (PZT), for example, is sandwiched between the lower and upper electrodes 13, 14. A lower surface 11n of the supporting portion 11a is mounted on a second surface 31B of the receiving member 31 (explained later in detail with reference to FIG. 3). The vibrating portion 15 having a predetermined resonant frequency resonates with ultrasonic waves received by the receiving member 31. The vibration of the vibrating portion 15 is converted into voltage signals by the vibration detector 12.

Figure 3:
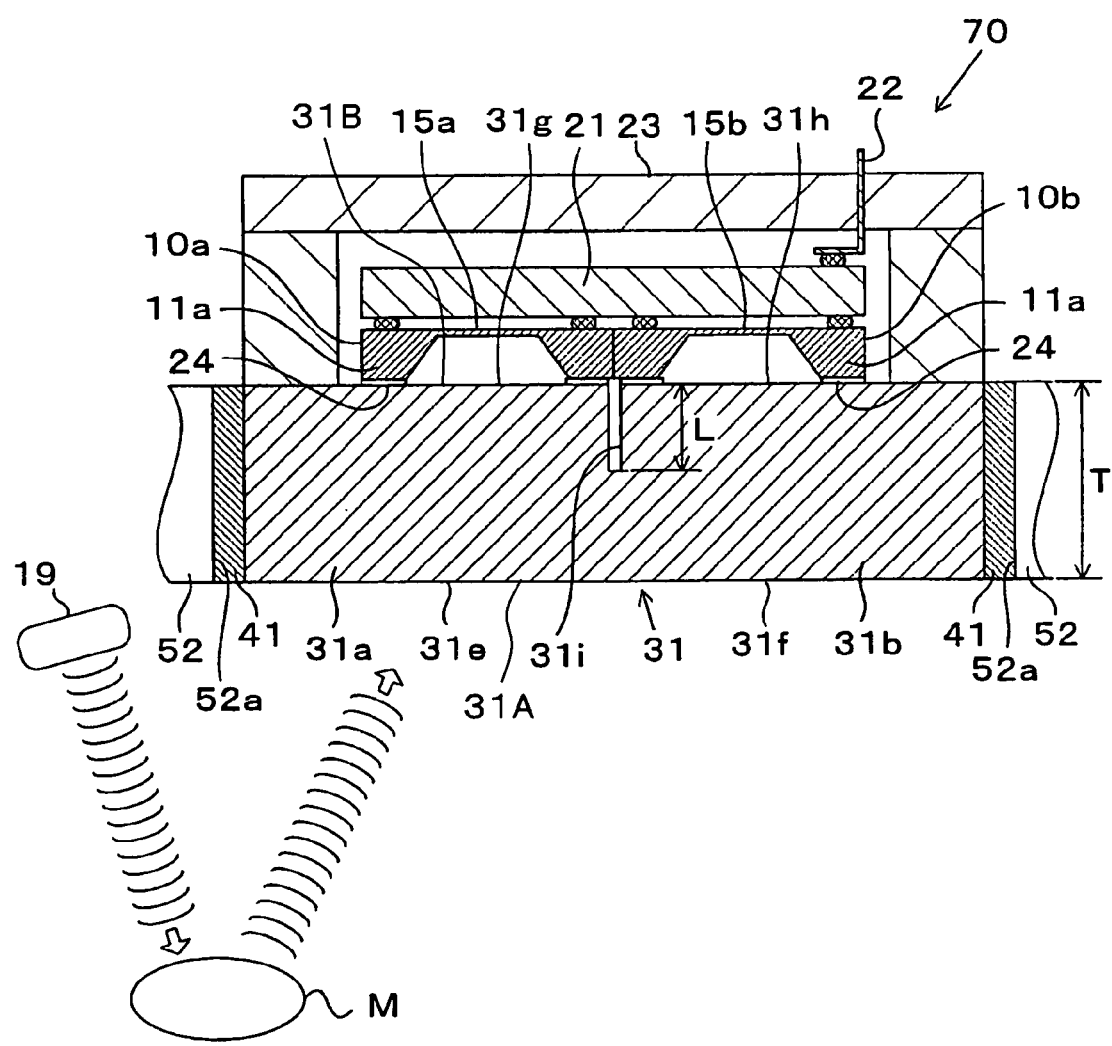
FIG. 3 is a cross-sectional view showing the ultrasonic sensor including a receiving member and a receiving element mounted on the receiving member.

Referring to FIG. 3, an ultrasonic sensor 70 will be described. As mentioned above, a receiving element 10 having four individual receiving elements 10a-10d, each having the same structure as shown in FIG. 2, is mounted on the receiving member 31, as shown in FIG. 3. By arranging the plural receiving elements as shown in FIG. 2, not only a distance to an object to be detected from the vehicle but a shape of the object can be detected in three-dimensional manner, based on time differences and phase differences among ultrasonic waves received by plural receiving elements.

As shown in FIG. 3, ultrasonic waves are transmitted from an on-board transmitting element 19, and ultrasonic waves reflected on an object M to be detected (e.g., an obstacle located around the vehicle) are received by the ultrasonic sensor 70 mounted on the vehicle. In the embodiment, the receiving member 31 formed in a square plate is inserted into a through-hole 52a formed in a bumper 52, so that a first surface 31A functioning as a receiving surface is exposed outside of the bumper 52 and a second surface 31B serving as a surface for mounting the receiving element 10 thereon faces an inside of the bumper 52. A resilient member 41 made of a material such as rubber is disposed between the through-hole 52a of the bumper 52 and the receiving member 31 to prevent propagation of the ultrasonic waves.

It is advantageous to use a material having an acoustic impedance similar to that of the supporting portion 11a as the receiving member 31 in order to effectively propagate the ultrasonic waves to the receiving element 10 (10a-10d). The receiving member 31 has to be mechanically strong and weatherproof to protect the receiving element 10 mounted thereon. In this embodiment, the receiving member 31 is made of polycarbonate which is the same material as that of the bumper 52. It is also advantageous in an ornamental design standpoint to use the same material as the bumper because the ultrasonic sensor 70 is not outstanding on the bumper 52. It is possible, however, to use stainless steel, a metallic material such an aluminum alloy, various resin materials, glass, ceramics or rubber as a material forming the receiving member 31.

An intercepting slit 31i is formed from the second surface 31B toward the first surface 31A to separate receiving regions corresponding to each individual receiving element. In FIG. 3, an example is shown. A receiving region 31a corresponding to the receiving element 10a is separated from a receiving region 31b corresponding to the receiving element 10b by an intercepting slit 31i. Propagation of the ultrasonic waves between the receiving regions 31a and 31b is prevented by the intercepting slit 31i because a high attenuation of the ultrasonic waves occurs in air existing in the intercepting slit 31i.

The receiving elements 10a, 10b are connected to the second surface 31B of the receiving member 31 with an connecting layer 24 made of adhesive or glass. More particularly, the lower surface 11n (shown in FIG. 1B) of the supporting portion 11a is connected to the second surface 31B, thereby separating the second surface 31B into an inner surface 31g corresponding to the vibrating portion 15a and an inner surface 31h corresponding to the vibrating portion 15b. Four individual receiving elements 10a-10d are mounted in the same manner, each being separated by the respective intercepting slits 31i (refer to FIG. 2).

A circuit element 21 for detecting electric signals outputted from the receiving element 10 (10a-10d) is disposed on the receiving element 10 and electrically connected thereto. The circuit element 21 is electrically connected to a terminal 22 for feeding electrical signals to an on-board electronic control unit (ECU). The receiving element 10 and the circuit element 21 mounted on the receiving member 31 are covered with a box-shaped casing 23.

The ultrasonic waves reflected on the obstacle M are received by a receiving area 31e corresponding to the receiving element 10a and a receiving area 31f corresponding to the receiving element 10b. Then, the ultrasonic waves are propagated to the supporting portion 11a through the receiving regions 31a, 31b. The vibrating portions 15a, 15b are vibrated by the propagated ultrasonic waves, and vibration of the vibrating portions 15a, 15b is converted into electrical signals by the piezoelectric vibration detector 12 (refer to FIG. 1B) The ultrasonic waves are converted into electrical signals in the same manner in all of the receiving elements 10a-10d. The circuit elements 21 processes the electrical signals outputted from the vibration detector 12. That is, noises included in the signals are removed, and the distance or the position of the obstacle M is calculated based on a time difference and/or a phase difference between the ultrasonic waves transmitted and received.

Figure 4:
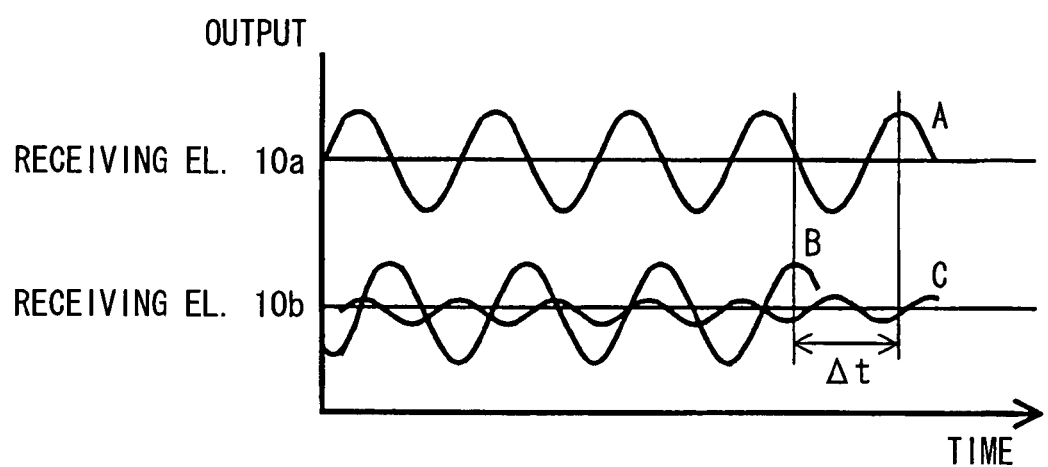
FIG. 4 is a graph showing outputs of a pair of neighboring receiving elements and an amount of crosstalk therebetween.

FIG. 4 is a graph for explaining a crosstalk between a pair of neighboring receiving elements 10a, 10b in a hypothetical situation. If the ultrasonic waves received by the receiving area 31e is exclusively propagated only to the receiving element 10a through the receiving region 31a, the output of the receiving element 10a will be "A" shown in FIG. 4. If the ultrasonic waves received by the receiving area 31f and a certain amount of a crosstalk from the receiving area 31e are superimposed in the receiving element 10b, the output of the receiving element 10b will be "B"+"C". "B" is an own output of the receiving element 10b having no crosstalk, which is delayed from "A" by Δt, and "C" is an output of the receiving element 10b due to a crosstalk with the receiving element 10a. "C" functions as a noise that adversely affects an accuracy in calculating a time difference or a phase difference between the ultrasonic waves received by neighboring receiving elements 10a, 10b.

In order to eliminate or reduce an amount of the crosstalk between the neighboring receiving elements, the intercepting slit 31i is formed in the embodiment of the present invention as shown in FIGS. 2 and 3. It is found out that a crosstalk is eliminated or suppressed by setting a ratio of a depth L of the intercepting slit 31i to a thickness T of the receiving member 31 to a proper range. It is defined here that a crosstalk percentage is a percentage of ultrasonic waves received by the receiving area 31e (for example) and propagated to the receiving element 10b versus the ultrasonic waves received by the receiving area 31e.

Figure 5:
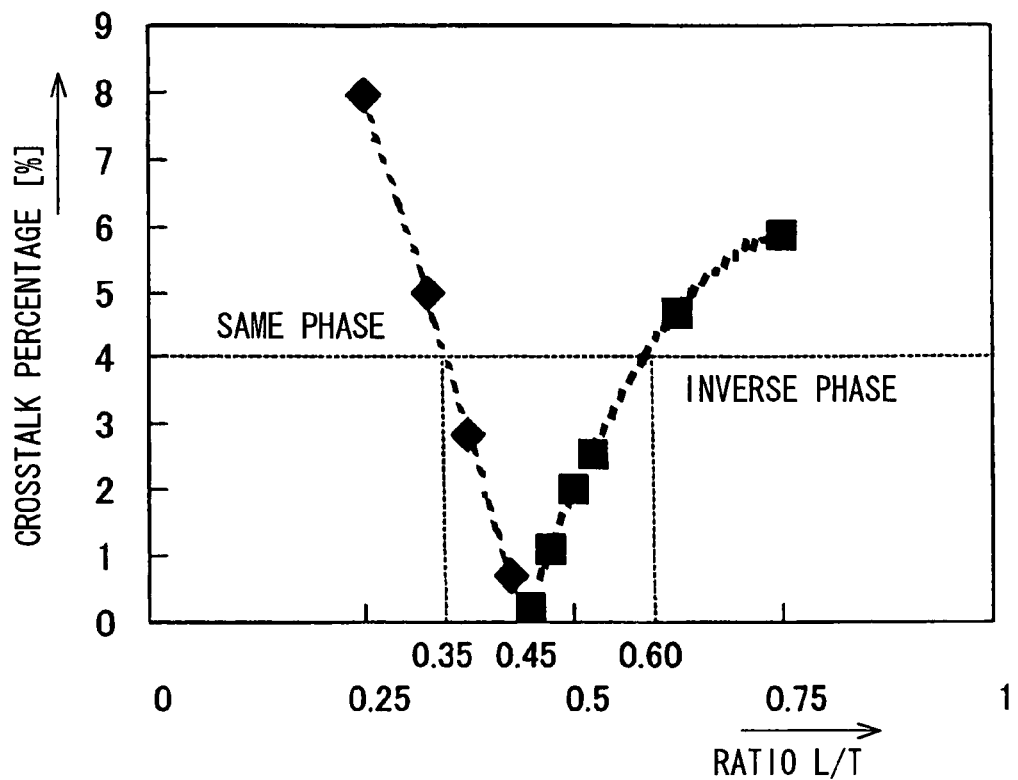
FIG. 5 is a graph showing a crosstalk percentage relative to a ratio L/T, where L is a depth of a slit and T is a thickness of a receiving member.

FIG. 5 shows the crosstalk percentage relative to a ratio L/T, where L is a depth of the intercepting slit 31i and T is a thickness of the receiving member. It is, of course, most desirable to bring the crosstalk ratio to zero. As seen in the graph, the crosstalk ratio is 8% when L/T=0.25 (i.e., when the depth L is not sufficiently deep; the crosstalk ratio becomes zero % when L/T=0.45; and it goes up again by making the depth L deeper. In the range where L/T is smaller than 0.45, the phase of the output due to the crosstalk is in the same phase with the main output (i.e., C is in the same phase with A in FIG. 4). On the other hand, in the range where L/T is larger than 0.45%, the phase of the output due to the crosstalk is in an inverse phase with the main output.

Figure 6:
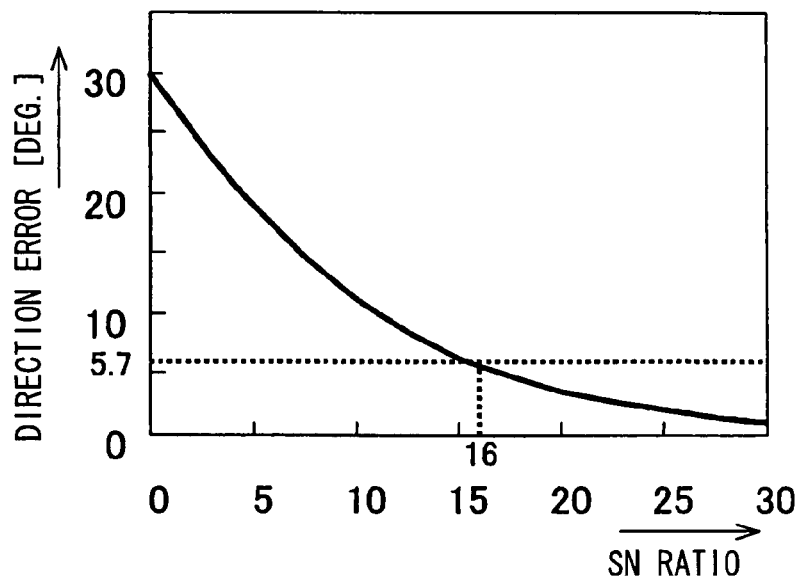
FIG. 6 is a graph showing a direction error in degrees relative to a signal to noise ratio in dB.

It is required for the ultrasonic sensor mounted on an automotive vehicle to realize an error of 10% or lower in detecting a position of an object. In order to realize the position error of 10% or lower, it is necessary to bring a direction error (in degree) calculated based on the phase difference of the ultrasonic waves to 5.7 degrees or smaller. As shown in FIG. 6, it is necessary to make a signal-to-noise ratio (SN ratio) higher than 16 dB to make the direction error lower than 5.7 degrees. The SN ratio 16 dB corresponds to the crosstalk percentage 4%. Accordingly, it is required to make the crosstalk percentage lower than 4%. This is realized by making the L/T ratio in a range from 0.35 to 0.60 ($0.35 \leq L/T \leq 0.60$).

In this particular embodiment, the thickness T of the receiving member is 4 mm, and the depth L of the intercepting slit 31i is 1.8 mm, thereby making the L/T ratio 0.45. Accordingly, the crosstalk percentage is 0%, i.e., the ultrasonic waves received by the receiving area 31e are exclusively propagated to the receiving element 10a, while the ultrasonic waves received by the receiving area 31f are exclusively propagated to the receiving element 10b. Thus, the time difference or the phase difference between the ultrasonic waves received by the receiving area 31e and 31f is accurately detected, and thereby a position of an obstacle is detected with high accuracy. Since the width of the intercepting slit 31i does not affect the crosstalk percentage, the width of the intercepting slit 31i can be arbitrarily selected.

If the L/T is made in a range of 0.35-0.45, the crosstalk percentage can be made sufficiently low while keeping the mechanical strength of the receiving member 31 high. This is because the depth of the intercepting slit 31i in this range does not much affect the mechanical strength of the receiving member 31. On the other hand, if the L/T is made in a range of 0.45-0.6, the crosstalk output (i.e., a noise component) is in inverse phase with the main output, the noise component can be easily processed separately from the signal.

Figure 7A:
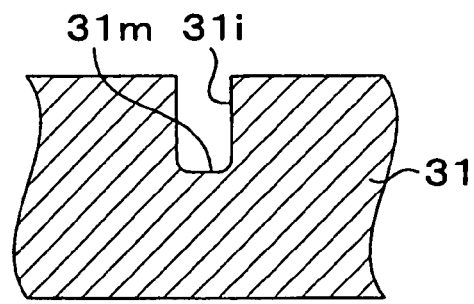
FIGS. 7A-7D are cross-sectional views showing modified forms of the slit formed in the receiving member.
Figure 7B:
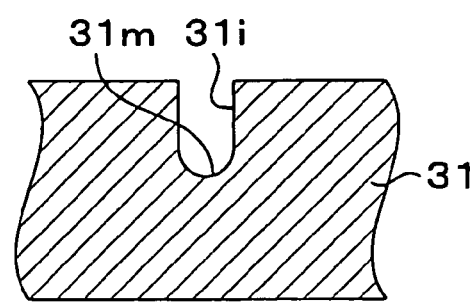
Figure 7C:
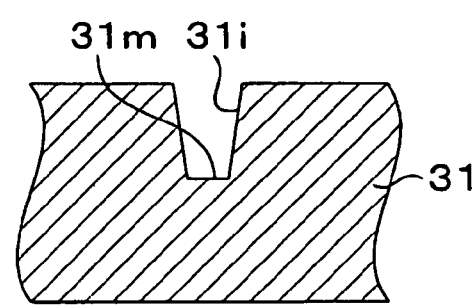
Figure 7D:
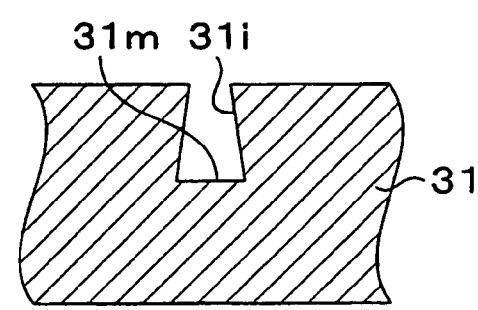

The shape of the intercepting slit 31i may be variously modified, as long as the formula $0.35 \leq L/T \leq 0.60$ is satisfied. Some examples of the modified forms are shown in FIGS. 7A-7D and FIGS. 8A-8C. In the modified form shown in FIG. 7A, corners of the bottom end 31m of the intercepting slit 31i are rounded (a radius is formed). In FIG. 7B, its bottom end 31m is made a semi-sphere surface. By eliminating sharp corners in this manner, the mechanical strength of the intercepting slit 31i is improved. It is also possible to make the side walls of the intercepting slit 31i tapered surfaces.

Figure 8A:
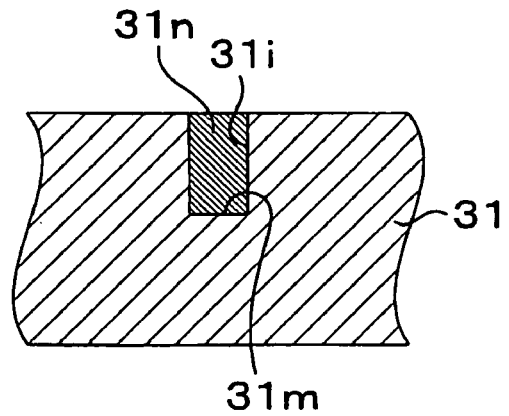
FIG. 8A-8C are cross-sectional views showing other modified forms of slit formed in the receiving member.
Figure 8B:
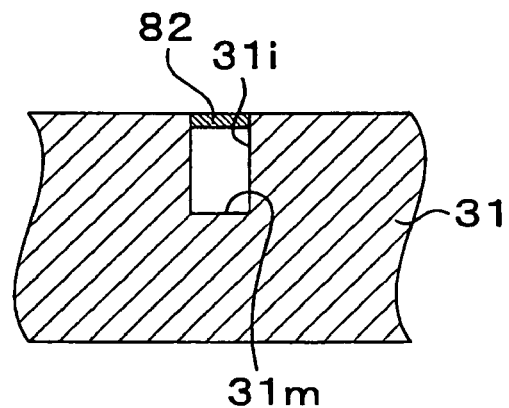
Figure 8C:
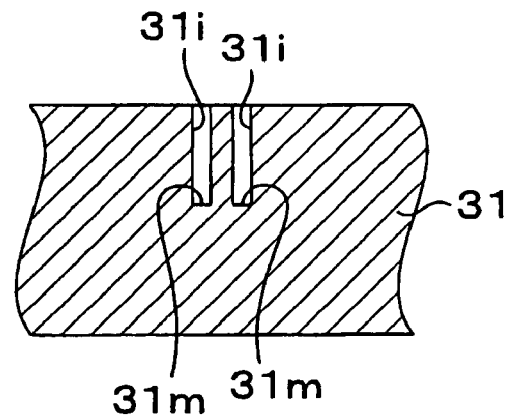

As shown in FIG. 8A, the intercepting slit 31i may be filled with filler 31n made of a material suppressing propagation of ultrasonic waves and having a Young's modulus lower than that of the receiving member 31, such as a gel-state material or rubber. It is also possible to close an opening of the intercepting slit 31i with a cover member 82 made of a metallic or resin material, as shown in FIG. 8B. In the structures shown in FIGS. 8A and 8B, foreign particles that may adversely affect the intercepting function of the slit are prevented from entering the intercepting slit 31i. As shown in FIG. 8C, the intercepting slit 31i may be divided into plural narrow slits. By narrowing the opening, the foreign particles are prevented from entering into the slits.

Advantages of the present invention will be summarized below. The receiving member 31 is sectioned by intercepting slits 31i into plural receiving regions each corresponding to individual receiving elements 10a-10d. Attenuation in propagating the ultrasonic waves is high in the intercepting slit 31i due to air therein. The crosstalk between neighboring individual receiving elements is prevented by the intercepting slits 31i. Therefore, accuracy in detecting positions of the obstacle is enhanced. In addition, the intercepting slits are easily made without making the ultrasonic sensor 70 large in size.

The depth L of the intercepting slit 31i relative to the thickness T of the receiving member 31 is made to satisfy the formula: $0.35 \leq L/T \leq 0.60$. In this manner, the crosstalk is surely suppressed. By making L/T=0.45, the crosstalk (noises) is eliminated, and the detecting sensitivity is maximized. By making L/T smaller than 0.45 and larger than 0.35, the crosstalk is suppressed while maintaining the mechanical strength of the receiving member 31. By making L/T larger than 0.45 and smaller than 0.60, the noise component due to crosstalk can be easily processed because the noise component is in an inverse phase to the signals.

The bottom end 31m of the intercepting slit 31i may be rounded or formed into a semi-spherical surface to maintain sufficient mechanical strength of the receiving member 31. The intercepting slits 31i may be divided into plural narrower slits to prevent foreign particles, which are harmful for intercepting propagation of the ultrasonic waves, from entering into the slits. It is also possible to fill the intercepting slit 31i with a material 31n which has a Young's modulus lower than that of the receiving member 31 and intercepts propagation of the ultrasonic waves. Alternatively, the open end of the intercepting slit 31i may be closed with a cover member 82 to prevent foreign particles from entering into the slit.

Vibration of the vibrating portion 15 is converted into electrical signals by the piezoelectric vibration detector 12. The ultrasonic waves can be effectively converted into electrical signals. The receiving member 31 is made of polycarbonate resin. Therefore, the acoustic impedance of the receiving member 31 can be made close to the acoustic impedance of the supporting portion 11a, and the ultrasonic waves can be effectively propagated to the receiving elements 10a-10d. Since the polycarbonate resin is weather-resistive and mechanically strong, the receiving element 10 can be properly protected by the receiving member 31. Further, an ornamental design of the bumper 52 is not damaged by mounting the ultrasonic sensor 70 thereon because the bumper is also made of the same resin material.

The present invention is not limited to the embodiment described above, but it may be variously modified. For example, the shape of the receiving element 10 and the receiving member 31 is not limited to a square shape, but it maybe round, polygonal or other shapes. The number of individual receiving elements formed on the receiving member 10 is not limited to four. When it is intended to detect two-dimensional detection, only two individual receiving elements are required. The layout of the individual receiving elements may be variously changed according to needs in actual applications. For example, they can be aligned in line or arranged along a circle.

It is possible to directly install the receiving element 10 to the bumper 52 without using the receiving member 31. In this case, part of the bumper 52 functions as the receiving member, and the ornamental design of the bumper is not adversely affected because the ultrasonic sensor 70 does not expose from the surface of the bumper. The mounting position of the ultrasonic sensor 70 is not limited to the bumper 52. It may be mounted on a vehicle body at a position above or underneath the bumper 52, where the reflected ultrasonic waves directly reach the ultrasonic sensor 70 without being intercepted by any other portions of the vehicle body. Further, the ultrasonic sensor 70 may be mounted on a winker cover when it is used for detecting obstacles positioned at sides of the vehicle. The ultrasonic sensor 70 maybe mounted on various positions of the vehicle according to its application purposes. It may be mounted on, for example, a headlight cover, a rear lamp cover, a backup light cover or the like. In these cases, the receiving element 10 may be directly mounted on the structures that function as the receiving member 31.

The vibrating portion 15 may be supported by a single supporting portion 11a in a cantilever manner. In this case, vibration of the vibrating portion 15 becomes large, compared with the vibrating portion 15 supported by a pair of the supporting portions 11a. In this manner, the sensitivity of the ultrasonic sensor 70 can be made higher. In place of the piezoelectric vibration detector 12, a capacitor-type vibration detector that detects vibration based on changes in a capacitor may be used. Since the capacitor-type detector has broad resonant frequencies, it can be manufactured easily without being required to make components very precisely.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An ultrasonic sensor for use in an automotive vehicle, comprising:
    a receiving member for receiving ultrasonic waves reflected on an object to be detected, the receiving member having a first surface for receiving the ultrasonic waves and a second surface;
    a receiving element having a plurality of vibrating portions and supporting portions supporting the vibrating portions, the receiving element being mounted on the receiving member so that the vibrating portions are vibrated by the ultrasonic waves received by the receiving member and propagated to the vibrating portions via the supporting portions; and
    an intercepting slit for intercepting crosstalk between neighboring receiving regions, each formed in the receiving member to correspond to each vibrating portion, the intercepting slit being formed to separate neighboring receiving regions, extending in a direction substantially perpendicular to the second surface, and having an opening on the second surface and a closed end in the receiving member; wherein:
    the intercepting slit is formed to satisfy a formula: $0.35 \leq L/T \leq 0.60$, where L is a depth of the intercepting slit and T is a thickness of the receiving member.

2. The ultrasonic sensor as in claim 1, wherein the intercepting slit is formed to satisfy a formula: $L/T=0.45$.

3. The ultrasonic sensor as in claim 1, wherein the intercepting slit is formed to satisfy a formula: $0.35 \leq L/T \leq 0.45$.

4. The ultrasonic sensor as in claim 1, wherein the intercepting slit is formed to satisfy a formula: $0.45 \leq L/T \leq 0.6$.

5. The ultrasonic sensor as in claim 1, wherein corners of the closed end of the intercepting slit are rounded.

6. The ultrasonic sensor as in claim 1, wherein the intercepting slit is divided into plural narrower slits.

7. The ultrasonic sensor as in claim 1, wherein the intercepting slit is filled with a material having a Young's modulus lower than that of the receiving member and suppressing propagation of the ultrasonic waves.

8. The ultrasonic sensor as in claim 1, wherein the opening of the intercepting slit is closed with a cover member.

9. The ultrasonic sensor as in claim 1, wherein vibration of the vibrating portions is converted into electrical signals by an piezoelectric vibration detector.

10. The ultrasonic sensor as in claim 1, wherein vibration of the vibrating portions is converted into changes in electrical capacitance by a capacitor-type detector having a pair of electrodes.

11. The ultrasonic sensor as in claim 1, wherein the receiving member is made of polycarbonate-type resin.

12. The ultrasonic sensor as in claim 1, wherein the ultrasonic sensor is mounted on a bumper of the automotive vehicle.

* * * * *